Nov. 16, 1926.
A. E. GARROD
1,607,524
GREASE RETAINER
Filed Sept. 17, 1925
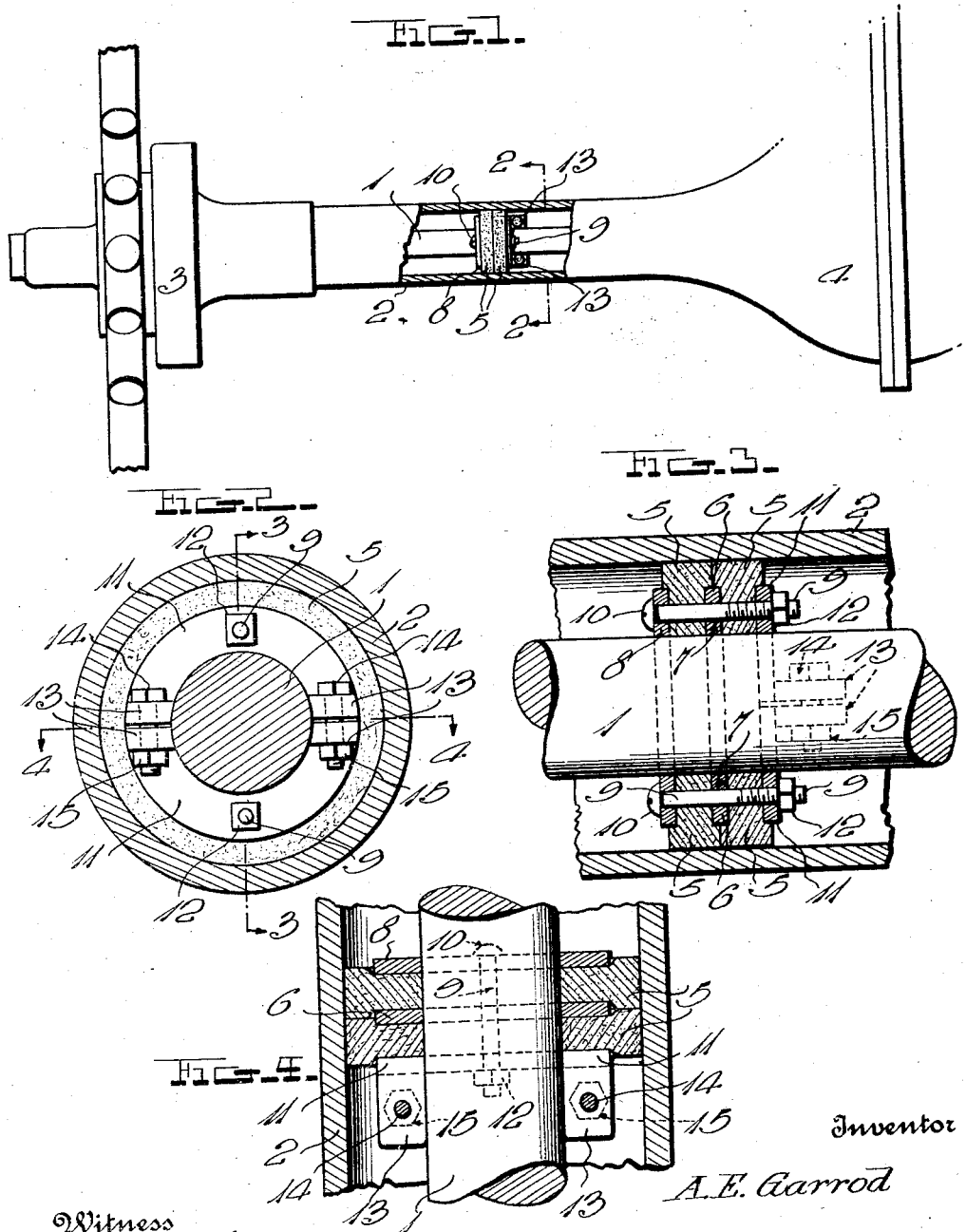
Witness
H. Woodard
Inventor
A. E. Garrod
By H. R. Willson & Co
Attorneys Patented Nov. 16, 1926.

1,607,524

UNITED STATES PATENT OFFICE.

ALBERT E. GARROD, OF FREEPORT, ILLINOIS.

GREASE RETAINER.

Application filed September 17, 1925. Serial No. 57,003.

My invention relates to improvements in grease retainers, the primary object being to provide a device readily attachable to the drive shaft of an automobile to prevent creeping of oil along the drive shaft and leaking out at the wheel hubs where it gets into the brake drums and spreads over the wheel generally.

Another object is to provide a grease retainer which may be readily clamped to an axle for rotation therewith, this clamping means permitting positive connection to the shaft at any preferred point.

A further object is to provide a novel means for effecting connection between the grease retainer and the driving axle, such means being effective regardless of the amount or number of packing rings employed.

With the foregoing and minor objects in view, the invention resides in the novel subject matter hereinafter described and claimed, the description being supplemented by the accompanying drawing.

Figure 1 is a fragmentary illustration of a rear driving axle tube with portions broken away to show the application of my grease retainer;

Figure 2 is a cross sectional view taken substantially on the line 2—2 of Fig. 1;

Figure 3 is a sectional view taken substantially on the line 3—3 of Fig. 2; and

Figure 4 is a sectional view taken substantially on the line 4—4 of Fig. 2.

This grease retainer is readily adaptable for use in connection with a semi-floating or full floating axle, though for the purpose of this application I have shown its adaptation to a semi-floating type of axle, this structure comprising broadly, an axle 1 enclosed by the usual axle tube 2 at the outer end of which is mounted a brake drum 3 while at the inner end, is disposed the usual differential casing 4 in which the grease is primarily placed.

While I have illustrated this retainer as comprising a pair of packing rings formed of yieldable material, it is understood that a single ring may be employed or that a greater number than is illustrated may be used if found more satisfactory. These packing rings 5 may be formed of any preferred material, such as felt or the like and are of such dimensions as to require a certain degree of compression in order to permit placing them in the space between the axle 1 and the axle 2. Preferably, these rings are spaced apart by means of a washer or spacing ring or plate 6 which is provided with openings 7 alinable with openings formed in the packing rings 5. Bearing against the outer face of one of the packing rings 5 is a retaining plate or collar 8 which is provided with openings alinable with the openings aforementioned for the reception of bolts 9 whose heads 10 bear against the outer face of the retaining plate or collar 8 while the other ends extend beyond the packing ring 5 arranged beyond the spacing washer 6.

For the purpose of securing this device at any preferred point and compressing the packing rings to prevent passage of grease or any other lubricant thereby, I provide a pair of substantially semi-circular retaining plates 11 which are apertured for the reception of the aforementioned extended ends of the bolts 9, these bolts having nuts 12 threaded thereon for the purpose of effecting any desired degree of compression of the packing rings 5 as is quite obvious. The adjacent ends of these semi-circular plates 11 are provided with pairs of lugs 13 which have alined threaded apertures for the reception of screw bolts 14 by means of which these two plates may be drawn together for frictional engagement with the shaft 1. A lock nut 15 is fixed to the threaded end portion of each bolt 14.

With a structure as above described it is obvious that the packing rings 5 may be easily expanded radially to any desired degree and the retainer as a unit may be fixed to any point upon the shaft 1 through adjustment of the bolts 14 as has been pointed out.

Excellent results have been obtained through using the details set forth and they are therefore preferably followed, but it is understood that such changes in structure as may fall within the scope of the appended claims, I consider within the spirit of my invention.

I claim:

1. A grease retainer of the character described comprising a yieldable packing ring, an annular reinforcing plate on one side of the packing ring, a two-part plate on the other side of the packing ring, means extending through the packing ring and plates to separately connect them, and means for clamping the parts of the two-part plate together against an axle to cause rotation of the retainer with the axle.

2. A grease retainer of the character described comprising a yieldable packing ring, an annular reinforcing plate at one side of the packing ring, a pair of substantially semi-circular plates arranged at the opposite side of the ring, bolts extending through the ring and plates to separately connect them, pairs of lugs on said semi-circular plates, and screw bolts connecting the lugs to clamp the semi-circular plates against an axle to cause rotation of the retainer with the axle.

In testimony whereof I have hereunto affixed my signature.

ALBERT E. GARROD.